(12) United States Patent
Saraswathi et al.

(10) Patent No.: US 10,161,278 B1
(45) Date of Patent: Dec. 25, 2018

(54) CATALYST ARRANGEMENT FOR INDUSTRIAL EMISSIONS CONTROL AND METHOD OF ASSEMBLING SAME

(71) Applicant: General Electric Company, Schenectady, NY (US)

(72) Inventors: Rajesh Prabhakaran Saraswathi, Karnataka (IN); Bradly Aaron Kippel, Greenville, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 15/609,969

(22) Filed: May 31, 2017

(51) Int. Cl.
| | |
|---|---|
| F01N 3/20 | (2006.01) |
| F01N 3/28 | (2006.01) |
| F01N 13/18 | (2010.01) |
| B01J 23/22 | (2006.01) |
| B01J 35/04 | (2006.01) |
| B01D 53/88 | (2006.01) |
| B01D 53/86 | (2006.01) |

(52) U.S. Cl.
CPC ......... *F01N 3/2066* (2013.01); *B01D 53/864* (2013.01); *B01D 53/8631* (2013.01); *B01D 53/8653* (2013.01); *B01D 53/885* (2013.01); *B01J 23/22* (2013.01); *B01J 35/04* (2013.01); *F01N 3/2892* (2013.01); *F01N 13/18* (2013.01); *B01D 2255/20723* (2013.01); *F01N 2370/02* (2013.01)

(58) Field of Classification Search
CPC ...... F01N 3/2066; F01N 13/18; F01N 3/2892; F01N 2370/02
USPC .................................................. 422/168, 181
See application file for complete search history.

(56) References Cited

U.S. PATENT DOCUMENTS

| | | |
|---|---|---|
| 5,024,981 A | 6/1991 | Speronello et al. |
| 7,638,107 B1 | 12/2009 | Wirt et al. |
| 2007/0110650 A1 | 5/2007 | Pfeifer et al. |
| 2007/0149385 A1 | 6/2007 | Liu et al. |
| 2008/0008629 A1 | 1/2008 | Doring et al. |
| 2008/0229733 A1* | 9/2008 | Newburry ............. F01N 3/2839 60/299 |
| 2016/0038878 A1 | 2/2016 | Sonntag et al. |

* cited by examiner

*Primary Examiner* — Tom P Duong
(74) *Attorney, Agent, or Firm* — Armstrong Teasdale LLP

(57) ABSTRACT

A catalyst arrangement for use with a selective catalytic reduction system includes a frame and a plurality of catalyst elements coupled to the frame. The plurality of catalyst elements is arranged vertically among a plurality of vertical stations. The plurality of vertical stations is successively defined along a height of the catalyst arrangement. The catalyst elements of at least one of the vertical stations are arranged at a plurality of axial positions with respect to an axial direction of a flow of exhaust gases through the selective catalytic reduction system.

20 Claims, 5 Drawing Sheets

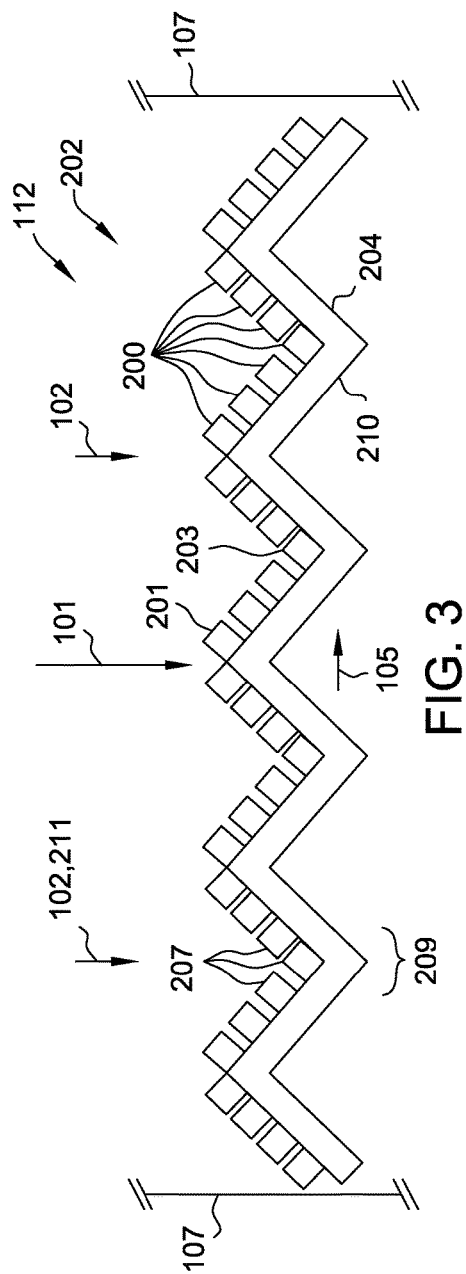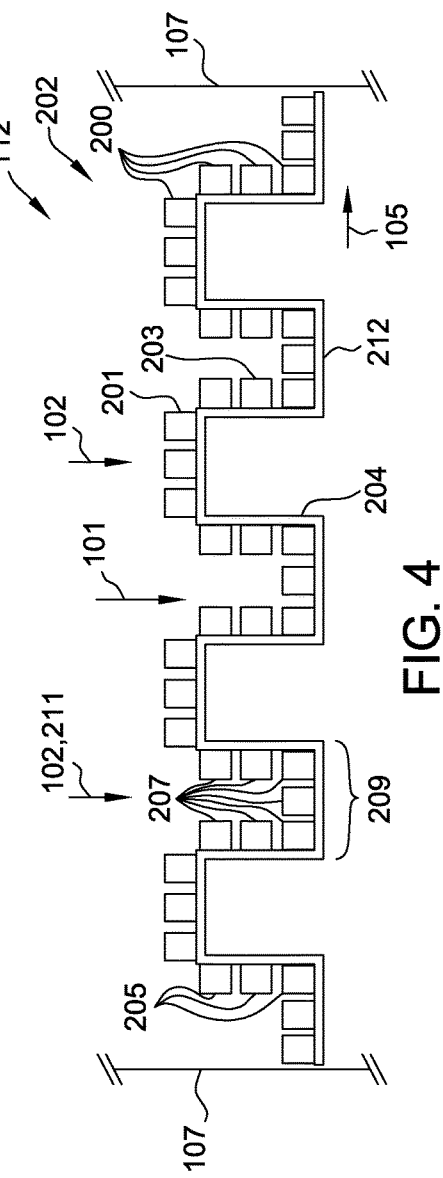

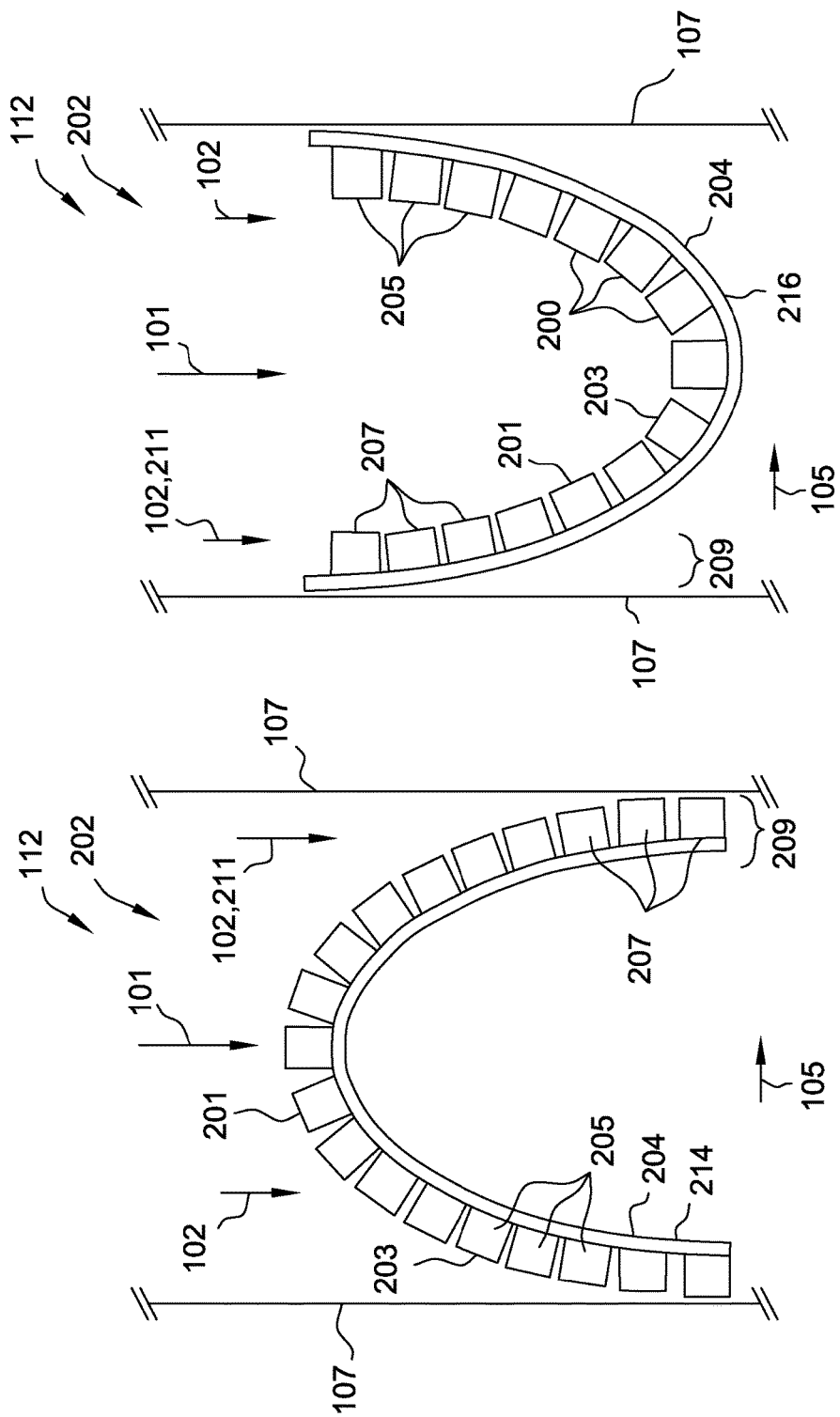

CATALYST ARRANGEMENT FOR INDUSTRIAL EMISSIONS CONTROL AND METHOD OF ASSEMBLING SAME

BACKGROUND

The embodiments described herein relate generally to industrial emissions control systems and, more particularly, to an arrangement for a catalyst in an industrial emissions control system.

At least some know industrial systems that combust hydrocarbon fuels, such as gas turbines, industrial boilers and furnaces, and reciprocating engines, generate pollutants such as, but not limited to, carbon monoxide (CO), unburned hydrocarbons (UHC), and oxides of nitrogen ($NO_x$). Emissions of such pollutants into an ambient atmosphere must be limited for safe operation.

One known technology for use in controlling stack emissions is Selective Catalytic Reduction. Selective Catalytic Reduction (SCR) is a method of reducing an amount of $NO_x$ and CO in the exhaust gas of fossil fuel-fired industrial and electric utility equipment. In at least some known SCR systems, anhydrous ammonia is mixed with the exhaust gas, and the mixture is channeled over a suitable reduction catalyst at a suitable temperature prior to being released into the atmosphere. For example, the catalyst is an active phase of vanadium pentoxide on a carrier of titanium dioxide. The catalyst is typically provided as a plurality of catalyst elements, such as honeycomb shaped substrates, arranged in a vertically and transversely extending wall perpendicular to the flow of oncoming exhaust gas.

In at least some cases, a total surface area of the catalyst required to reduce pollutant concentration necessitates that a height and width of the wall be quite large, relative to a duct that supplies the exhaust gas to be treated. A depth of the catalyst elements may be limited due to a pressure drop caused by gas travel through the catalyst elements, eliminating increased wall depth as an option to increase catalyst surface area. Moreover, space in industrial systems is typically limited and/or expensive, necessitating as small of a footprint as possible for the SCR system. As a result, an inlet duct of at least some known SCR systems inclines steeply in height as it approaches the wall of catalyst elements. However, the rapid change in cross-sectional area of the inlet duct may result in flow separation and/or recirculation zones, which in turn increases pressure drop and/or non-uniformity of gas flow temperature and velocity over the catalyst. As a result, performance of the catalyst may vary across the wall, and a useful lifetime of some catalyst elements may be reduced. Moreover, in at least some cases, a height of an upstream ammonia injection grid and/or a height of a downstream exhaust stack must be designed to accommodate the height of the wall.

BRIEF DESCRIPTION

In one aspect, a catalyst arrangement for use with a selective catalytic reduction system is provided. The catalyst arrangement includes a frame and a plurality of catalyst elements coupled to the frame. The plurality of catalyst elements is arranged vertically among a plurality of vertical stations. The plurality of vertical stations is successively defined along a height of the catalyst arrangement. The catalyst elements of at least one of the vertical stations are arranged at a plurality of axial positions with respect to an axial direction of a flow of exhaust gases through the selective catalytic reduction system.

In another aspect, a selective catalytic reduction system is provided. The selective catalytic reduction system includes a reaction duct configured to receive a flow of exhaust gases from an industrial plant, and a catalyst arrangement. The catalyst arrangement includes a plurality of catalyst elements positioned with respect to the reaction duct. The plurality of catalyst elements is arranged vertically among a plurality of vertical stations. The plurality of vertical stations is successively defined along a height of the catalyst arrangement. The catalyst elements of at least one of the vertical stations are arranged at a plurality of axial positions with respect to an axial direction of the flow of exhaust gases through the reaction duct.

In yet another aspect, a method of assembling a selective catalytic reduction system is provided. The method includes positioning a frame within a reaction duct. The reaction duct is configured to receive a flow of exhaust gases from an industrial plant. The method also includes coupling a plurality of catalyst elements to the frame such that the plurality of catalyst elements is arranged vertically among a plurality of vertical stations and transversely across the reaction duct. The catalyst elements of at least one of the vertical stations are arranged at a plurality of axial positions with respect to an axial direction of the flow of exhaust gases through the reaction duct.

DRAWINGS

FIG. 1 a schematic diagram of an exemplary selective catalytic reduction (SCR) system;

FIG. 3 is a schematic view of a vertical station of a second exemplary embodiment of a catalyst arrangement for use with the SCR system shown in FIG. 1;

FIG. 4 is a schematic view of a vertical station of a third exemplary embodiment of a catalyst arrangement for use with the SCR system shown in FIG. 1;

FIG. 5 is a schematic view of a vertical station of a fourth exemplary embodiment of a catalyst arrangement for use with the SCR system shown in FIG. 1;

FIG. 6 is a schematic view of a vertical station of a fifth exemplary embodiment of a catalyst arrangement for use with the SCR system shown in FIG. 1;

DETAILED DESCRIPTION

The exemplary systems and methods described herein overcome at least some disadvantages of known selective catalytic reduction (SCR) systems. More specifically, the embodiments described herein include a catalyst arrangement for an SCR system. The catalyst arrangement includes at least one vertical station that includes catalyst elements arranged at a plurality of axial positions, with respect to an axial direction of a flow of exhaust gases through the SCR system. Thus, the embodiments described herein enable a greater surface area of the catalyst to be packed into a given height and width of a catalyst arrangement, facilitating less of an incline in a height of the inlet duct, for example.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
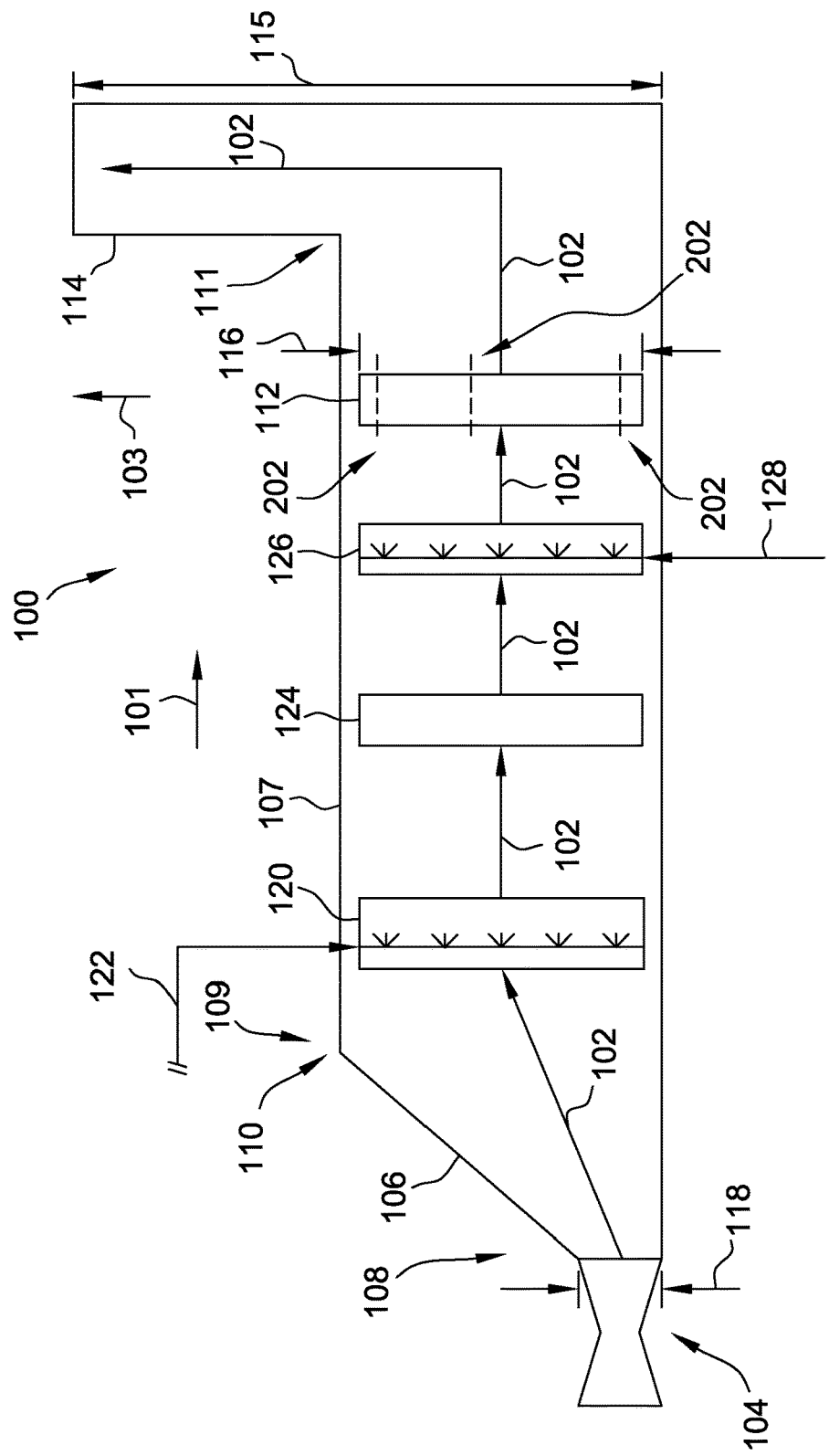

FIG. 1 is a schematic diagram of an exemplary embodiment of a selective catalytic reduction (SCR) system 100. In the exemplary embodiment, SCR system 100 is configured to control pollutant emissions from exhaust gases 102 generated by combustion of hydrocarbon fuel by an industrial plant 104. In the exemplary embodiment, industrial plant 104 is a gas turbine. In alternative embodiments, industrial plant 104 is any suitable industrial plant that enables SCR system 100 to function as described herein.

SCR system 100 includes an inlet duct 106, a reaction duct 107, and an exhaust stack 114 coupled in flow communication. More specifically, inlet duct 106 is configured to receive exhaust gases 102 from industrial plant 104 and channel exhaust gases 102 to reaction duct 107. Reaction duct 107 is configured to channel exhaust gases 102 in a generally axial direction 101 through active elements of SCR system 100, including a catalyst arrangement 112. Exhaust stack 114 is configured to receive exhaust gases 102 from reaction duct 107, channel exhaust gases 102 in a generally vertical direction 103 through additional emissions control elements, and release the treated exhaust gases 102 to the atmosphere. In the exemplary embodiment, a height 115 of exhaust stack 114 must establish a predetermined height above a top of catalyst arrangement 112 to enable exhaust stack 114 to function effectively.

Inlet duct 106 extends from a first end 108 downstream to a second end 110. In the exemplary embodiment, first end 108 has a size, including a height 118, configured to receive exhaust gases 102 channeled from industrial plant 104, and second end 110 is sized to match a size of reaction duct 107. Reaction duct 107 extends from a first end 109, coupled to inlet duct second end 110, to a second end 111, coupled to exhaust stack 114. Reaction duct 107 is sized to accommodate catalyst arrangement 112, that is, to accommodate a height 116 and a width 117 (in a transverse direction 105, shown in FIG. 2) of catalyst arrangement 112. In the exemplary embodiment, reaction duct 107 has a substantially constant cross-section between first end 109 and second end 111. In alternative embodiments, reaction duct 107 has a cross-section that varies between first end 109 and second end 111 in any suitable fashion that enables SCR system 100 to function as described herein.

In the exemplary embodiment, to facilitate a total surface area of a catalyst included in catalyst arrangement 112 being sufficient to treat an amount of pollutants in exhaust gases 102, height 116 of catalyst arrangement 112 is greater than height 118 of inlet duct first end 108, such that inlet duct 106 increases in height between first end 108 and second end 110. In alternative embodiments, inlet duct 106 has any suitable height profile between first end 108 and second end 110 that enables SCR system 100 to function as described herein.

In the exemplary embodiment, SCR system 100 also includes a tempering air injection system 120 positioned in reaction duct 107 upstream from catalyst arrangement 112. Tempering air injection system 120 is configured to mix tempering air 122 with exhaust gases 102 within reaction duct 107. For example, tempering air 122 is configured to condition a temperature and/or concentration of exhaust gases 102 to facilitate a primary chemical reaction involving pollutants within exhaust gases 102 at catalyst arrangement 112.

In the exemplary embodiment, tempering air injection system 120 is sized to substantially correspond to height 116 and width 117 of catalyst arrangement 112, such that uniform tempering of exhaust gases 102 arriving at catalyst arrangement 112 is facilitated across height 116 and width 117. In alternative embodiments, tempering air injection system 120 has any suitable size that enables SCR system 100 to function as described herein.

In alternative embodiments, SCR system 100 does not include tempering air injection system 120.

SCR system 100 further includes a co-catalyst arrangement 124 and an ammonia injection grid 126 positioned in reaction duct 107 upstream from catalyst arrangement 112. More specifically, in the exemplary embodiment, tempering air injection system 120, co-catalyst arrangement 124, and ammonia injection grid 126 are positioned in serial flow relationship upstream from catalyst arrangement 112. Co-catalyst arrangement 124 is suitably configured to facilitate a preliminary chemical reaction involving pollutants within exhaust gases 102, and ammonia injection grid 126 is suitably configured to mix ammonia 128 with exhaust gases 102 within reaction duct 107 to facilitate the primary reaction at catalyst arrangement 112.

In the exemplary embodiment, co-catalyst arrangement 124 is sized to substantially correspond to height 116 and width 117 of catalyst arrangement 112, such that uniform preliminary reactions throughout exhaust gases 102 arriving at catalyst arrangement 112 are facilitated across height 116 and width 117. Similarly in the exemplary embodiment, ammonia injection grid 126 also is sized to substantially correspond to height 116 and width 117 of catalyst arrangement 112, such that uniform ammonia mixing throughout exhaust gases 102 arriving at catalyst arrangement 112 is facilitated across height 116 and width 117. In alternative embodiments, each of co-catalyst arrangement 124 and ammonia injection grid 126 has any suitable size that enables SCR system 100 to function as described herein.

Figure 2:
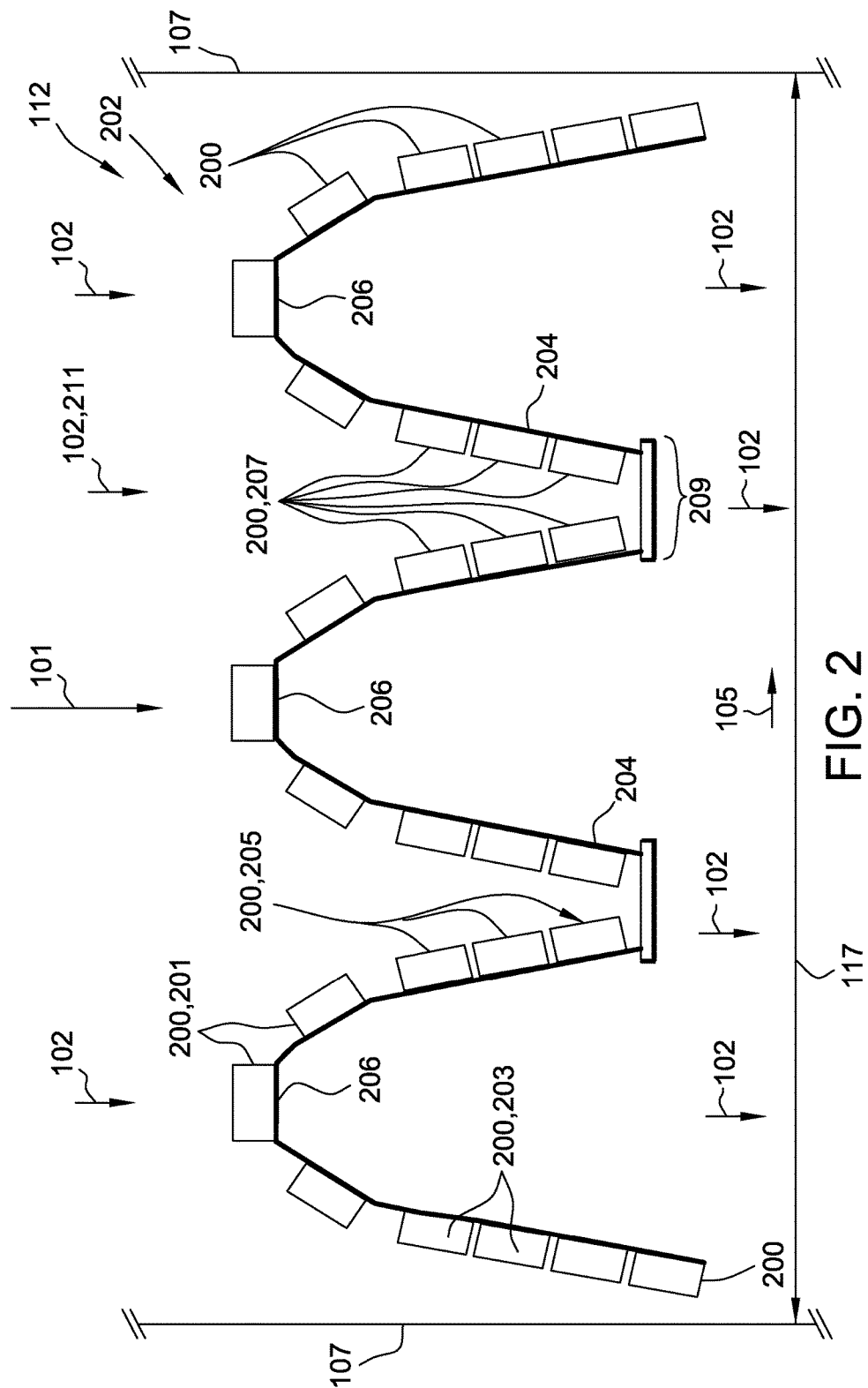
FIG. 2 is a schematic view of a vertical station of a first exemplary embodiment of a catalyst arrangement for use with the SCR system shown in FIG. 1.

FIG. 2 is a schematic view of a vertical station 202 of a first exemplary embodiment of catalyst arrangement 112. With reference to FIGS. 1 and 2, catalyst arrangement 112 is positioned in reaction duct 107 downstream from ammonia injection grid 126. Catalyst arrangement 112 includes a frame 204 positioned within reaction duct 107 and configured to position a plurality of catalyst elements 200 with respect to reaction duct 107. More specifically, catalyst elements 200 are coupled to frame 204. Frame 204 is configured to facilitate passage of exhaust gases 102 therethrough, for example after exhaust gases 102 have been channeled through catalyst elements 200. For example, frame 204 has a truss and/or mesh structure. In alternative embodiments, plurality of catalyst elements 200 are positioned with respect to reaction duct 107 in any suitable fashion that enables SCR system 100 to function as described herein.

In the exemplary embodiment, frame 204 is configured to arrange plurality of catalyst elements 200 vertically among a plurality of vertical stations 202, and transversely across width 117. Vertical stations 202 are successively defined along height 116 of catalyst arrangement 112. More specifically, each vertical station 202 is perpendicular to vertical direction 103, that is, each vertical station 202 is generally planar, extending in axial direction 101 and transverse direction 105. Although three vertical stations 202 are identified in FIG. 1, it should be understood that catalyst arrangement 112 has any suitable number of vertical stations 202 along height 116 that enables SCR system 100 to function as described herein.

In the exemplary embodiment, each catalyst element 200 includes a suitable honeycomb-shaped substrate (not shown) coated with an active phase of vanadium pentoxide on a carrier of titanium dioxide. In alternative embodiments, each catalyst element 200 includes any suitable substrate shape coated with any suitable catalyst that enables SCR system 100 to function as described herein.

At least one vertical station 202 includes catalyst elements 200 arranged at a plurality of axial positions with respect to axial direction 101. For example, in the exemplary embodiment, each vertical station 202 includes at least one catalyst element 200, designated catalyst element 201, positioned completely upstream from another catalyst element 200, designated catalyst element 203. For another example, in the exemplary embodiment, each vertical station 202 includes at least three catalyst elements 200, designated catalyst elements 205, aligned in series along axial direction 101, such that a line parallel to axial direction 101 intersects each of the at least three catalyst elements 205 aligned in series.

In some embodiments, each of plurality of vertical stations 202 has a substantially identical arrangement of catalyst elements 200. In alternative embodiments, at least one vertical station 202 has an arrangement of catalyst elements 200 that differs from an arrangement of catalyst elements 200 of another of vertical stations 202.

In certain embodiments, at least one vertical station 202 includes a concentrated group 207 of catalyst elements 200 axially aligned with a flow region 211 of exhaust gases 102 incident at that vertical station 202, the flow region 211 having at least one local flow characteristic. More specifically, concentrated group 207 of catalyst elements 200 has a greater number of catalyst elements 200 along a transverse portion 209 of vertical station 202, as compared to other transverse portions of vertical station 202. For example, in some such embodiments, a structure of ammonia injection grid 126 results in a locally less effective mixing (for purposes of the primary chemical reaction) of ammonia 126 and exhaust gases 102 in at least one flow region 211, relative to other flow regions of exhaust gases 102 incident at vertical station 202. A concentrated group 207 of catalyst elements 200 is axially aligned with flow region 211 to facilitate completion of the primary chemical reaction for exhaust gases 102 in less effectively mixed flow region 211. For another example, in some such embodiments, a structure of tempering air injection system 120 results in a locally less effective temperature (for purposes of the primary chemical reaction) of exhaust gases 102 in at least one flow region 211, relative to other flow regions of exhaust gases 102 incident at vertical station 202. Concentrated group 207 of catalyst elements 200 is axially aligned with flow region 211 to facilitate completion of the primary chemical reaction for exhaust gases 102 in flow region 211 having the less effective temperature.

In the first embodiment of catalyst arrangement 112 illustrated in FIG. 2, frame 204 at the illustrated vertical station 202 includes a series of transversely adjacent U-shaped sections 206, with a closed end of each U-shaped section 206 extending upstream towards the incoming flow of exhaust gases 102. Catalyst elements 200 are coupled to an upstream side of each U-shaped section 206, such that catalyst elements 200 are arranged at a plurality of axial positions, facilitating packing of an increased number of catalyst elements 200 along vertical station 202 as compared to a flat transverse wall of catalyst elements (not shown). In some embodiments, the legs of each U-shaped section 206 include at least one of catalyst element 203 positioned completely downstream from catalyst element 201, at least three catalyst elements 205 aligned in series along axial direction 101, and concentrated group 207 of catalyst elements 200 axially aligned with flow region 211 having at least one local flow characteristic of exhaust gases 102 incident at vertical station 202.

FIG. 3 is a view of a vertical station 202 of a second exemplary embodiment of catalyst arrangement 112. In the second embodiment of catalyst arrangement 112 illustrated in FIG. 3, frame 204 at the illustrated vertical station 202 includes a transversely extending sawtooth shape 210. Catalyst elements 200 are coupled to an upstream side of sawtooth shape 210, such that catalyst elements 200 are arranged at a plurality of axial positions, facilitating packing of an increased number of catalyst elements 200 along vertical station 202 as compared to a flat transverse wall of catalyst elements (not shown). In some embodiments, the downstream vertices of sawtooth shape 210 include at least one of catalyst element 203 positioned completely downstream from catalyst element 201 and concentrated group 207 of catalyst elements 200 axially aligned with flow region 211 having at least one local flow characteristic of exhaust gases 102 incident at vertical station 202.

FIG. 4 is a view of a vertical station 202 of a third exemplary embodiment of catalyst arrangement 112. In the third embodiment of catalyst arrangement 112 illustrated in FIG. 4, frame 204 at the illustrated vertical station 202 includes a transversely extending square-wave shape 212. Catalyst elements 200 are coupled to an upstream side of square-wave shape 212, such that catalyst elements 200 are arranged at a plurality of axial positions, facilitating packing of an increased number of catalyst elements 200 along vertical station 202 as compared to a flat transverse wall of catalyst elements (not shown). In some embodiments, the axially extending portions of square-wave shape 212 include at least one of catalyst element 203 positioned completely downstream from catalyst element 201, at least three catalyst elements 205 aligned in series along axial direction 101, and concentrated group 207 of catalyst elements 200 axially aligned with flow region 211 having at least one local flow characteristic of exhaust gases 102 incident at vertical station 202.

FIG. 5 is a view of a vertical station 202 of a fourth exemplary embodiment of catalyst arrangement 112. In the fourth embodiment of catalyst arrangement 112 illustrated in FIG. 5, frame 204 at the illustrated vertical station 202 includes a convex shape 214 between transversely opposing sides of reaction duct 107. Catalyst elements 200 are coupled to an upstream side of convex shape 214, such that catalyst elements 200 are arranged at a plurality of axial positions, facilitating packing of an increased number of catalyst elements 200 along vertical station 202 as compared to a flat transverse wall of catalyst elements (not shown). In some embodiments, convex shape 214 includes at least one of catalyst element 203 positioned completely downstream from catalyst element 201, at least three catalyst elements 205 aligned in series along axial direction 101, and concentrated group 207 of catalyst elements 200 axially aligned with flow region 211 having at least one local flow characteristic of exhaust gases 102 incident at vertical station 202.

FIG. 6 is a view of a vertical station 202 of a fifth exemplary embodiment of catalyst arrangement 112. In the fifth embodiment of catalyst arrangement 112 illustrated in FIG. 6, frame 204 at the illustrated vertical station 202 includes a concave shape 216 between transversely opposing sides of reaction duct 107. Catalyst elements 200 are coupled to an upstream side of concave shape 216, such that catalyst elements 200 are arranged at a plurality of axial positions, facilitating packing of an increased number of catalyst elements 200 along vertical station 202 as compared to a flat transverse wall of catalyst elements (not shown). In some embodiments, the axially extending portions of concave shape 216 include at least one of catalyst element 203 positioned completely downstream from catalyst element 201, at least three catalyst elements 205 aligned in series along axial direction 101, and concentrated group 207 of catalyst elements 200 axially aligned with flow region 211 having at least one local flow characteristic of exhaust gases 102 incident at vertical station 202.

In alternative embodiments, frame 204 has any suitable shape that enables catalyst elements 200 to be arranged at a plurality of axial positions, facilitating packing of an increased number of catalyst elements 200 along vertical station 202 as compared to a flat transverse wall of catalyst elements (not shown).

Figure 7:
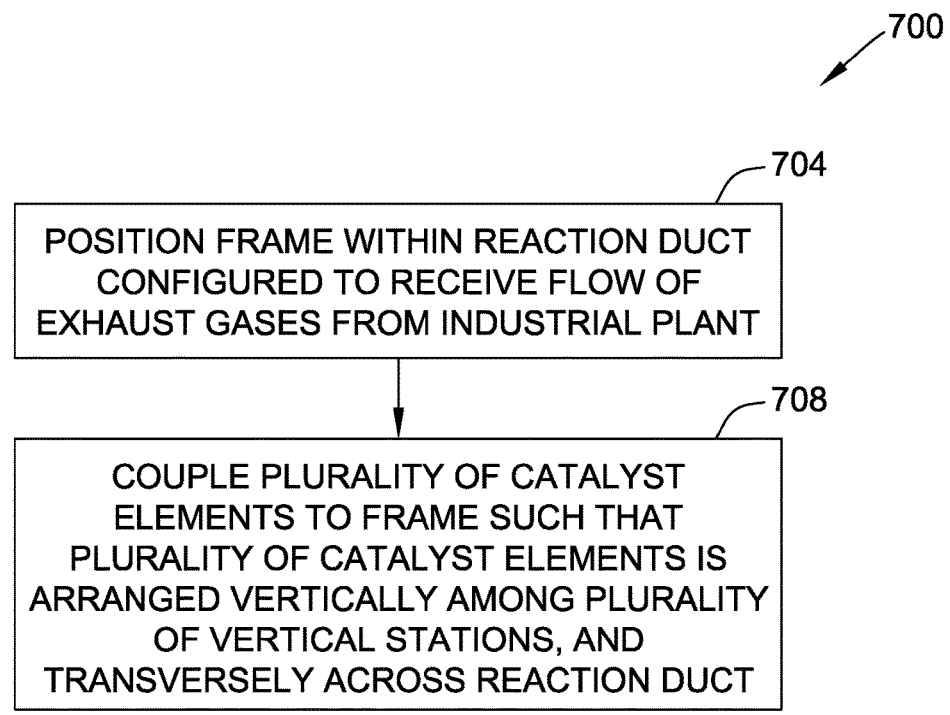
FIG. 7 is a flow diagram of a method of assembling a selective catalytic reduction system, such as the SCR system shown in FIG. 1.

FIG. 7 is a flow diagram of a method 700 of assembling a selective catalytic reduction system, such as SCR system 100. In the exemplary embodiment, method 700 includes positioning 704 a frame, such as frame 204, within a reaction duct, such as reaction duct 107. The reaction duct is configured to receive a flow of exhaust gases from an industrial plant, such as industrial plant 104. Method 700 also includes coupling 708 a plurality of catalyst elements, such as catalyst elements 200, to the frame such that the plurality of catalyst elements is arranged vertically among a plurality of vertical stations, such as vertical stations 202, and transversely across the reaction duct. The catalyst elements of at least one of the vertical stations are arranged at a plurality of axial positions with respect to an axial direction of the flow of exhaust gases through the reaction duct.

The embodiments described herein include a catalyst arrangement for an SCR system, and method of assembling the system. The catalyst arrangement includes at least one vertical station that includes catalyst elements arranged at a plurality of axial positions. The embodiments described herein provide advantages over at least some known SCR systems that include catalyst elements arranged in a generally flat wall along the transverse direction with no variation in position along the axial direction. Specifically, the embodiments described herein enable a greater surface area of the catalyst to be packed into a given height and width of a catalyst arrangement. Accordingly, for a given industrial plant, the embodiments described herein facilitate treatment of exhaust gases by the SCR system with a reduced overall height of the catalyst arrangement, and therefore a reduced height of the reaction duct housing the catalyst arrangement. An incline in height between an inlet duct first end and second end is correspondingly reduced, thereby reducing flow separation and/or recirculation zones in the inlet duct and reaction duct and improving an efficiency of SCR system 100.

Also specifically, in some embodiments, the reduced height of the catalyst arrangement provides additional advantages, such as a correspondingly reduced height of a tempering air injection system, a co-catalyst arrangement, and/or an ammonia injection grid sized to cooperate with the catalyst arrangement. Also specifically, in some embodiments, the reduced height of the catalyst arrangement facilitates a reduced height of an exhaust stack. In particular, for some locations of the associated industrial plant, the height of the exhaust stack may implicate regulatory restrictions, and because the exhaust stack typically must extend for a fixed height above the top of the catalyst arrangement in order to function effectively, a reduction of height of the catalyst arrangement may be the most effective approach to reducing the height of the exhaust stack to meet those regulatory requirements.

Also specifically, in certain embodiments, the embodiments enable a width of the catalyst arrangement to be reduced, resulting in a more compact footprint for the SCR system, and/or a reduced width of an ammonia injection grid to facilitate a less complex injection system.

Exemplary embodiments of a catalyst arrangement for use in a Selective Catalytic Reduction (SCR) system, and methods of assembling the system, are described above in detail. The disclosure is not limited to the specific embodiments described herein, but rather, components of systems and/or steps of the methods may be utilized independently and separately from other components and/or steps described herein. For example, the catalyst arrangement may also be used in combination with other industrial systems, and is not limited to practice with only the gas turbine engine as described herein. Rather, the embodiments can be implemented and utilized in connection with many other industrial applications.

Although specific features of various embodiments of the disclosure may be shown in some drawings and not in others, this is for convenience only. Moreover, references to one embodiment in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A catalyst arrangement for use with a selective catalytic reduction system, said catalyst arrangement comprising:
    a frame; and
    a plurality of catalyst elements coupled to an upstream side of said frame, said plurality of catalyst elements arranged vertically among a plurality of vertical stations, said plurality of vertical stations successively defined along a height of said catalyst arrangement, wherein said catalyst elements of at least one of said vertical stations are arranged at a plurality of axial positions with respect to an axial direction of a flow of exhaust gases through said selective catalytic reduction system.

2. The catalyst arrangement in accordance with claim 1, wherein said at least one vertical station comprises at least one of said catalyst elements positioned completely upstream from another of said catalyst elements.

3. The catalyst arrangement in accordance with claim 1, wherein said at least one vertical station comprises at least three of said catalyst elements aligned in series along the axial direction.

4. The catalyst arrangement in accordance with claim 1, wherein said at least one vertical station comprises a concentrated group of said catalyst elements axially aligned with a flow region of the exhaust gases having at least one local flow characteristic.

5. The catalyst arrangement in accordance with claim 1, wherein each of said catalyst elements comprises an active phase of vanadium pentoxide on a carrier of titanium dioxide.

6. The catalyst arrangement in accordance with claim 1, wherein said frame comprises at least one of: a series of transversely adjacent U-shaped sections, a transversely extending sawtooth shape, a transversely extending square-wave shape, a convex shape, and a concave shape.

7. A selective catalytic reduction system comprising:
a reaction duct configured to receive a flow of exhaust gases from an industrial plant; and
a catalyst arrangement comprising:
a plurality of catalyst elements positioned with respect to said reaction duct, said plurality of catalyst elements arranged among a plurality of vertical stations with respect to a vertical direction, said plurality of vertical stations successively defined along a height of said catalyst arrangement, wherein said catalyst elements of at least one of said vertical stations are arranged in a transverse plane across a width of said reaction duct and at a plurality of axial positions with respect to an axial direction of the flow of exhaust gases through said reaction duct, and wherein the transverse plane is perpendicular to the vertical direction.

8. The selective catalytic reduction system in accordance with claim 7, further comprising an ammonia injection grid positioned in said reaction duct upstream from said catalyst arrangement.

9. The selective catalytic reduction system in accordance with claim 7, further comprising a co-catalyst arrangement positioned in said reaction duct upstream from said catalyst arrangement.

10. The selective catalytic reduction system in accordance with claim 7, further comprising a tempering air injection system positioned in said reaction duct upstream from said catalyst arrangement.

11. The selective catalytic reduction system in accordance with claim 7, further comprising a tempering air injection system, a co-catalyst arrangement, and an ammonia injection grid positioned in said reaction duct in a serial flow relationship upstream from said catalyst arrangement.

12. The selective catalytic reduction system in accordance with claim 7, further comprising an inlet duct configured to receive the flow of exhaust gases from the industrial plant and channel the exhaust gases to said reaction duct, said inlet duct extends from a first end downstream to a second end, said second end is sized to match a size of said reaction duct, wherein said inlet duct increases in height between said first end and said second end.

13. The selective catalytic reduction system in accordance with claim 7, further comprising an exhaust stack configured to receive the exhaust gases from said reaction duct, channel the exhaust gases in a generally vertical direction, and release the exhaust gases to atmosphere.

14. The selective catalytic reduction system in accordance with claim 7, wherein said at least one vertical station comprises at least one of said catalyst elements positioned completely upstream from another of said catalyst elements.

15. The selective catalytic reduction system in accordance with claim 7, wherein said at least one vertical station comprises at least three of said catalyst elements aligned in series along the axial direction.

16. The selective catalytic reduction system in accordance with claim 7, wherein said at least one vertical station comprises a concentrated group of said catalyst elements axially aligned with a flow region of the exhaust gases having at least one local flow characteristic.

17. A method of assembling a selective catalytic reduction system, said method comprising:
positioning a frame within a reaction duct, the reaction duct configured to receive a flow of exhaust gases from an industrial plant; and
coupling a plurality of catalyst elements to the frame such that the plurality of catalyst elements is arranged among a plurality of vertical stations with respect to a vertical direction and in a transverse plane across a width of the reaction duct, wherein the catalyst elements of at least one of the vertical stations are arranged at a plurality of axial positions with respect to an axial direction of the flow of exhaust gases through the reaction duct, and wherein the transverse plane is perpendicular to the vertical direction.

18. The method in accordance with claim 17, further comprising coupling the plurality of catalyst elements to the frame such that the at least one vertical station includes at least one of the catalyst elements positioned completely upstream from another of the catalyst elements.

19. The method in accordance with claim 17, further comprising coupling the plurality of catalyst elements to the frame such that the at least one vertical station includes at least three of the catalyst elements aligned in series along the axial direction.

20. The method in accordance with claim 17, further comprising coupling the plurality of catalyst elements to the frame such that the at least one vertical station includes a concentrated group of the catalyst elements axially aligned with a flow region of the exhaust gases having at least one local flow characteristic.

* * * * *